United States Patent Office 2,948,777
Patented Aug. 9, 1960

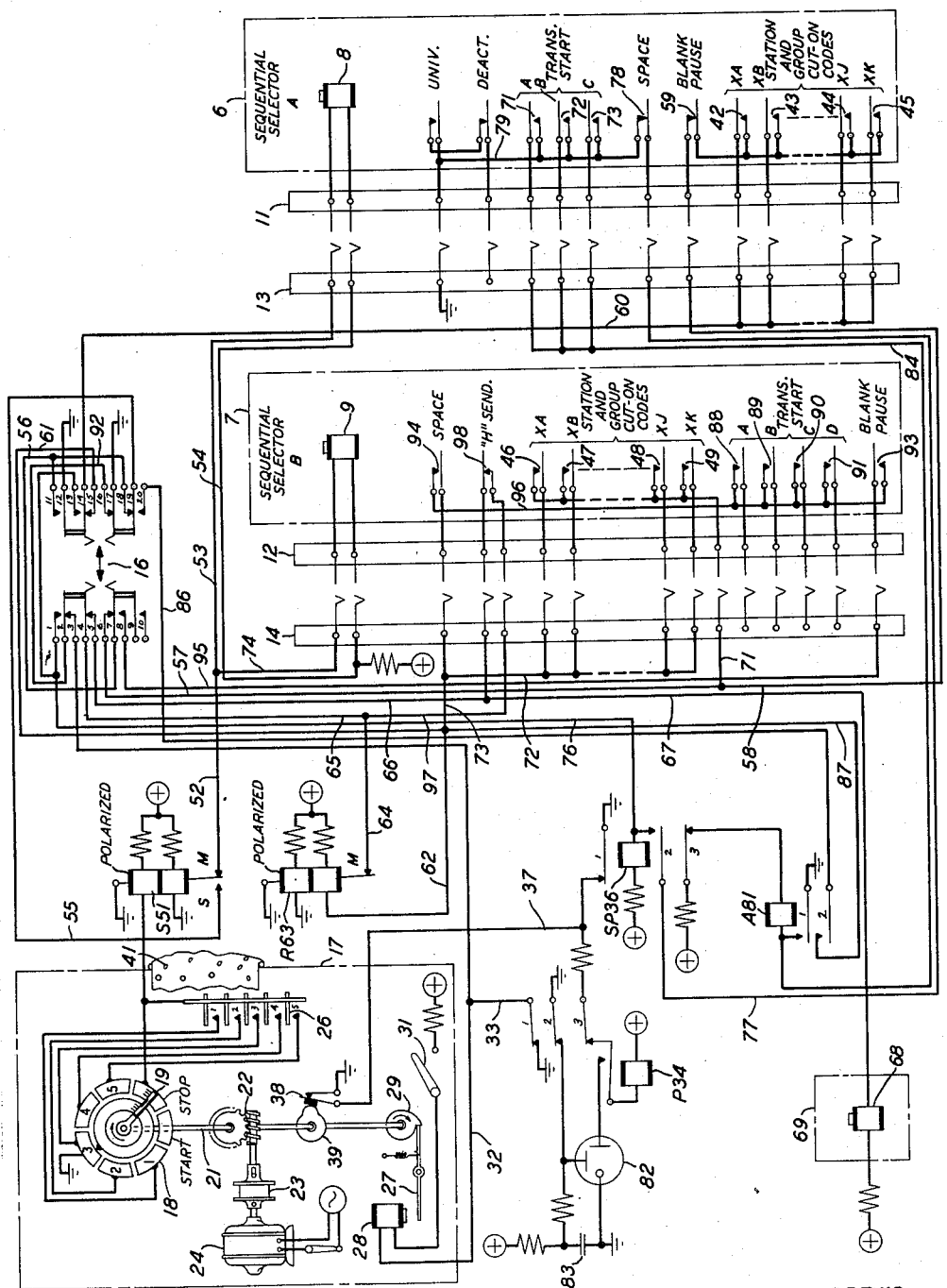

2,948,777

TEST SET FOR SELECTOR MECHANISM

Clayton F. Andrews, West Springfield, Mass., and Daniel W. Chamberlin, Wantagh, and James T. Neiswinter, Garden City, N.Y., assignors to American Telephone and Telegraph Company, a corporation of New York Filed Mar. 19, 1956, Ser. No. 572,290

5 Claims. (Cl. 178—69)

This invention relates to test apparatus and particularly to circuits and equipment for testing selector mechanisms that perform switching operations in response to permutation code signals.

Still more specifically the invention relates to test apparatus for testing signal responsive sequential selectors of a type which is sometimes identified by the name "Sotus" unit, and which selectively operates switching contacts in response to sequences of two or more permutation code signals.

Teletypewriters, which employ permutation code signal responsive selector mechanisms, afford visual evidence of their response to test signals, because they are printing instrumentalities and record characters in response to signals impressed upon their selector mechanisms. Signal responsive sequential selectors, which also employ permutation code signal responsive selector mechanisms, merely close switching contacts in response to received signals, and do not afford visual indication of their response to the signals.

Accordingly, it is an object of the present invention to afford visual indication of the response of switching selector mechanisms to test signals.

Another object of the invention is to produce a permanent printed record of the response of switching selectors to test signals.

The invention features the employment of a teletypewriter printer for producing the permanent printed record of the tests.

As disclosed in Bacon-Branson-Knandel-Locke application Serial No. 119,184, filed October 1, 1949, which issued on October 9, 1956, as Patent No. 2,766,318, sequential selectors of the type that are to be tested by the circuit and apparatus embodying the present invention may be used for selectively connecting one or more receiving teletypewriters to a line in response to the respective address codes identifying the teletypewriters, the line being served by a switching center from which messages to be selectively received by the teletypewriters are transmitted. Another use of the sequential selector, as disclosed in that application, is the control of the starting of any one of a plurality of transmitters associated with a transmission channel extending to the switching center, whereat the messages transmitted by the transmitters are to be received, the starting of transmitters being accomplished under the control of transmitter start patterns of signals transmitted from the switching center and decoded by the sequential selector. The sequential selector that is disclosed in the Bacon, Branson, Knandel and Locke application to the extent necessary to show its manner of use in the switching system is fully disclosed in Keyes and Sim Patent 2,543,174, granted February 27, 1951, and in W. J. Zenner Patent 2,568,264, granted September 18, 1951, the disclosures of which are incorporated herein by reference as part of the present specification.

As is disclosed in the Bacon-Branson-Knandel-Locke application, the sequential selector has an activated condition, in which it will decode station address codes comprising two characters, and will operate switching contacts corresponding to the received address codes. In its deactivated condition, it will not operate the teletypewriter selecting contacts, the purpose of the deactivation being to prevent the operation of switching contacts under the control of sequences of characters appearing in a message that are the same as address codes. The activation of the selector is affected under the control of a sequence of codes comprising Figures, H and Letters which is a disconnect signal and results in the disconnection of teletypewriters at the end of a message, and the activation of the selector in preparation for reception of address codes. The deactivation is affected in response to the Line Feed or Carriage Return signal or both.

Whether in the activated or deactivated condition, the sequential selector is always responsive to a transmitter start pattern of codes, which may be transmitted when the channel outgoing from the switching center is idle or when transmission to one or more teletypewriters is in progress, and in the latter case, the transmission to the teletypewriters is interrupted for the transmission of the transmitter start pattern. The transmitter start pattern comprises the code combination Blank, followed by a timed pause, at the end of which the code combination Space is transmitted, this being in turn followed by the code combination for a single character comprising the signal for selecting a particular transmitter, such as A or B. As disclosed in the Bacon-Branson-Knandel-Locke application, the selective single character is followed by the signal for Letters, whereupon outgoing transmission, if it had been interrupted for the transmitter start pattern, is resumed. In the event that the selected transmitter has no message awaiting transmission, the switching center will, after a timed interval, transmit another complete start pattern, differing from the one described above by the inclusion of a different single transmitter selecting character code.

The sequential selector is provided with a mechanical timing mechanism which is set in operation in response to the Blank signal, and which times an interval corresponding to the pause between the Blank and Space signals, operating just before the end of that interval to close contacts that will hereinafter be called Blank-Pause contacts, and to unblock the selectable element that responds to the signal Space in order that it may be selected in response to that signal. The Space signal is effective to unblock all of the transmitter start contact operating members so that any one of them may respond to its assigned code. The arrangement is such that only one transmitter selecting character may be transmitted as part of any transmitter start pattern, it being necessary to transmit the Blank and Space code combinations, with the intervening pause, for each attempted starting of a transmitter. This type will be identified hereinafter as sequential selector A.

In W. M. Bacon-D. E. Branson-G. J. Knandel-G. A. Locke application Serial No. 392,789, filed November 18, 1953, which issued on January 27, 1959, as Patent No. 2,871,286, there is disclosed a sequential selector mechanism operable in the same manner as the one above described, insofar as the selection of teletypewriter printers to receive messages is concerned, but differing in two respects insofar as the starting of transmitters is concerned. One of these differences is that a transmitter start pattern is not limited by the operation of the sequential selector to the transmission of only one transmitter starting character as part of that pattern. The other difference is that the sequential selector unit is provided with contacts operable by a cam, the contour of which is such as to cause the contacts to generate the code combination for the character H in a single revolution of the cam. The mode of operation of the sequential selector thus equipped is that in response to the Blank and Space signals with an intervening pause and followed by a transmitter selecting character, such as A, the H signal generating cam is set in operation for one revolution. If the transmitter selected by the single character has a message awaiting transmission, a shunt has been established across the H signal generating contacts, preventing the transmission of that signal, and the reception of message material at the switching center causes the transmission on the outgoing channel of a Letters signal which nullifies the condition established by the Blank signal, the pause and the Space signal. With this nullification, none of the transmitter start contacts can be operated in response to corresponding characters appearing in the text of message material. If, on the other hand, the reception of a transmitter start character does not result in the starting of the designated transmitter, because that transmitter has no message tape awaiting transmission, the H signal will be transmitted to the switching center and the reception of that signal will cause the immediate transmission of the next transmitter start character, such as the signal for the letter B, without repetition of the preliminary portion of the pattern comprising the Blank and Space signals with the intervening pause, and this will continue until the starting of a transmitter has been accomplished or until a full roll call of all of the transmitters has been made without finding any having a message tape awaiting transmission, in which case a Letters signal will be transmitted to nullify the effect of the Blank and Space signals and, after a timed interval, another roll call will be initiated by the transmission of the Blank and Space signals with the intervening pause. This type will be identified hereinafter as sequential selector B.

The testing set in accordance with the present invention is arranged to test the response of either type of selector unit to transmitter start signals and also to test the response of either type to station selecting or teletypewriter connecting signals, the test being the same in the case of the station selection test for both types of selector units and being different in the case of transmitter start signals for the two different types of selector units.

For a complete understanding of the invention, reference may be had to the following detailed description to be interpreted in the light of the accompanying drawing which shows a schematic circuit diagram of a test set for testing either type of sequential selector mechanism.

Referring to the drawing, the reference numeral 6 is applied to a dotted-line rectangle which represents sequential selector A, and the reference numeral 7 designates a similar rectangle representing sequential selector B. The sequential selector units are shown schematically in a manner similar to their showing in the Bacon et al. applications hereinbefore identified. None of their mechanical elements is shown, but only those of their electrical components that are involved in the making of tests on these units, including their signal responsive selector magnets, designated by the reference numerals 8 and 9 in the sequential selectors A and B, respectively, and certain contacts which will be identified hereinafter.

It is frequently the custom to equip sequential selector units with multicontact plugs to the prongs of which all of the electrical elements are connected, in order that a unit which has developed a trouble may be quickly removed from service and a trouble-free unit substituted. The drawing shows connecting plugs 11 and 12 for sequential selector units A and B, respectively, on which only those prongs through which necessary electrical connections to the test circuit have been shown. The test circuit is equipped with separate multicontact sockets 13 and 14 through which connections from the test circuit to a sequential selector unit A or B are made. Only one type of sequential selector unit may be connected while any tests are being made.

It will be assumed that a sequential selector A has been connected to the test circuit by the insertion of its connection plug 11 into socket 13, and that the unit is to be tested first for the operation of its teletypewriter connecting contacts, which are sometimes called station cut-on contacts. The test circuit includes a three-way key 16 which conditions the circuit for making different types of tests. Key 16 is equipped with an operating lever which, in its intermediate position, permits its right and left-hand contact springs, numbered 1 to 10 and 11 to 20, respectively, to be in their normal condition, which is the condition shown. When the operating lever is moved to the left the contacts 1 to 10 are operated off normal, which conditions the circuit for testing the response of a sequential selector B to transmitter start patterns, and when the operating lever is moved to the right, contact springs 11 to 20 are operated off normal for testing the response of a sequential selector A to transmitter start patterns.

In the preferred embodiment of the invention, the source of signals for testing the sequential selector units is a tape transmitter-distributor, the principal elements of which are shown within a dotted-line rectangle 17. This unit includes a distributor face 18 and a cooperating brush arm 19 driven by shaft 21 through gears 22 and a friction clutch 23 from motor 24. The transmitter-distributor also includes tape-sensing contacts 26 for coding the segments of the distributor in accordance with code combinations in a perforated tape. In the idle condition of the test circuit, the distributor shaft is held at rest through the cooperation of the armature lever 27 of a start magnet 28 with shaft arrestment cam 29 carried by shaft 21. Start magnet 28 is energizable by the closure of manual switch 31 which completes a circuit from battery through the switch, the winding of magnet 28, conductors 32 and 33, armature 1 and front contact of relay P34 to ground, that relay being normally energized and being releasable and reoperable under circumstances which will be described hereinafter. The circuit that holds relay P34 normally operated extends from battery through the winding of that relay, its front contact and armature 3, and the back contact and armature 1 of relay SP36 to ground, the latter relay being normally released. A path to ground in parallel with the back contact and armature 1 of relay SP36 is traced over conductor 37 and the transmitter auxiliary contacts 38 that are held closed by cam 39 on distributor shaft 21 when that shaft is at rest. Contacts 38 open after shaft 21 begins to rotate and reclose before it comes to rest, but these contacts do not affect the locking circuit for relay P34 while relay SP36 remains unoperated.

A special test tape 41 containing a sequence of test signals is employed for testing the response of either type of sequential selector to station cut-on codes. Tape 41 may be formed into a closed loop so that the transmitter-distributor may be permitted to run continuously to test repetitiously a sequential selector unit.

Since each sequential selector unit has selectable elements to render it responsive to the station cut-on codes and the transmitter start codes of the stations and transmitters that it serves, and since it would be undesirable to provide a test tape particularly adapted to the testing of each individual sequential selector unit, it is preferable to employ a standard tape and to adapt the sequential selector unit to be responsive to the station cut-on and transmitter start codes contained in that tape. As is disclosed in the Keyes et al. and Zenner patents hereinbefore identified, the selectable elements that control the operation of switching contacts may be lifted out without the use of tools and others slipped into place in substitution for those removed. Either type of sequential selector unit is equipped with contacts to be operated in response to ten different two-character station cut-on codes. In the drawing four of the ten contacts have been shown, the station cut-on contacts in sequential selector A being designated by the reference numerals 42, 43, 44 and 45, and the station cut-on contacts in sequential selector B being designated by the reference numerals 46, 47, 48 and 49.

It will be assumed that the selectable elements that are substituted in either type of sequential selector unit for the testing of response to station cut-on codes are responsive to cut-on codes XA, XB, XC, XD, XE, XF, XG, XI, XJ and XK. For a thorough testing of the station cut-on contacts of a sequential selector unit, it is proposed to include in the test tape the following sequence of codes. Letters, repeated five times, Figures, H, Letters, XA, Letters, R, Letters, Carriage Return, Line Feed, Letters, Figures, repeated three times, 1, Figures, H, Letters, Line Feed, Letters, H, Letters, XA, Letters, XA, repeated five times, the word "trouble", Figures, H, Letters, XB, Letters, Line Feed, Letters, Figures, 2, Figures, H, Letters, X, Letters, A, Letters, B, Letters, C, Letters, D, Letters, E, Letters, F, Letters, G, Letters, I, Letters, J, Letters, K, Letters, Line Feed, Letters, XA, Letters, the word "trouble," Figures, H, Letters, XC, Letters, Line Feed, Letters, Figures, 3, Figures, H, Letters, XD, Letters, Line Feed, Letters, Figures, 4, Figures, H, Letters, XE, Letters, Line Feed, Letters, Figures, 5, Figures, H, Letters, XF, Letters, R, Letters, Carriage Return, Line Feed, Letters, Figures, 6, Figures, H, Letters, XG, Letters, Line Feed, Letters, Figures, 7, Figures, H, Letters, XI, Letters, Line Feed, Letters, Figures, 8, Figures, H, Letters, XJ, Letters Line Feed, Letters, Figures, 9, Figures, H, Letters, XK, Letters, Line Feed, Letters, Figures, 0 and Letters, repeated five times. The repeated Letters signals at the beginning and end of the tape may be overlapped for splicing, and the tape should be placed in the transmitter with one of those five superposed Letters signals above the sensing pins.

The transmission path from distributor 18 extends through the operating winding of biased polar relay S51 to battery, the continuous ring of the distributor face being grounded. The armature of relay S51 is grounded, and a transmission path is traced from the marking contact over conductors 52 and 53, selector magnet 8 of sequential selector unit A, and conductor 54 to battery. A transmission path is also traced from the spacing contact of relay S51 over conductor 55, normally closed contacts 19 and 18 of key 16, conductor 56, normally closed contacts 7 and 6 of key 16, conductors 57 and 58, Blank-Pause contacts 59 of sequential selector A, which are normally closed, to one spring of all of the normally open station cut-on contacts. The other spring of each of the station cut-on contacts is connected over conductor 60, contacts 14 and 15 of key 16, conductors 61 and 62, and lower winding of relay R63 to battery. The upper or biasing winding of relay R63 operates the armature to its marking contact in the absence of current through the operating winding, and the transmission from the spacing contact of relay S51 over the path just traced, including any of the contacts 42, 43, 44 and 45, when they are closed, is on an inverse neutral basis, the relay R63 being operated by its operating winding to spacing. The armature of relay R63 is grounded, and a path is traced from its marking contact over conductors 64 and 65, contacts 4 and 5 of key 16, conductors 66 and 67, and selector magnet 68 of a teletypewriter printer, represented by the dotted-line rectangle 69, to battery. The teletypewriter printer may be of the type shown in Patent 1,904,164, granted April 18, 1933, to S. Morton et al., and the disclosure of that patent is incorporated herein by reference as part of the present specification.

Upon the placement of the tape 41 into the transmitter and the closure of switch 31, the sequence of signals hereinbefore given is transmitted to relay S51 and repeated by that relay to selector magnet 8 of sequential selector A.

The sequence of signals transmitted to selector magnet 8 begins with Letters signals. Sequential selector A recognizes the Letters Signal as the end of a transmitter start pattern, and its effect would be to release any of the transmitter start contacts 71, 72 and 73 if any such contact were locked in the operated condition at the time of connection of plug 11 to socket 13. The sequence Figures, H and Letters, which follows the Letters signals, establishes the activate condition of the sequential selector A, in which condition contacts 42, 43, 44 and 45 will operate and lock in response to their address codes XA, XB, XJ and XK, respectively. The address code XA is next received by selector magnet 8, causing contacts 42 to close and lock, thereby establishing the transmission path to the operating winding of relay R63. The next signal is a Letters signal, and causes the printer 69 to perform an unshift or Letters shift condition if it should happen to be in the upper case condition. The next signal is the code for the letter R which is repeated to and recorded by the printer 69. The Letters signal following the R has no effect on either sequential selector A or printer 69, the latter having been placed in the unshift condition prior to the transmission of the R signal. The Carriage Return and Line Feed signals following the Letters signal cause the printer 69 to perform these functions, and these signal following the Line Feed signal has no effect on that it cannot close any of the contacts 43, 44 and 45. Contacts 42, however, remain locked. The Letters signal following the Line Feed signal has no effect on either the sequential selector A or printer 69. The three Figures signals following the Letters signal are repeated to printer 69, and it operates to the shift condition. The character 1 transmitted following the three Figures signals is recorded by printer 69 on the next line below and directly under the character R, because of the Carriage Return and Line Feed functions that have been performed in printer 69.

The sequence Figures, H and Letters follows the character 1, and this is the activate and disconnect signal, causing the release of contacts 42 and the conditioning of sequential selector A to respond to further address codes. With contacts 42 open, relay R63 is disconnected from the spacing contact of relay S51. The Line Feed signal following the activate code immediately deactivates sequential selector A so that no station cut-on contacts may be operated nor any other significant operation performed by a series of signals that follow, comprising Letters, H, Letters, XA, Letters, XA, repeated five times, and the signals for the word "trouble." The tape includes, following the word "trouble," the activate sequence comprising Figures, H and Letters which again activates sequential selector A. This is followed by the address code XB which causes the closure of contacts 43, again connecting the operating winding of relay R63 to the spacing contact of relay S51. The Letters signal, following XB, causes printer 69 to unshift because it was left in the shift condition at the time of opening of contacts 42, because of the Figures signal of the disconnect code that it received following the signal for the character 1. The next signal is a Line Feed signal which causes a Line Feed operation in the printer and deactivation of sequential selector A. The next two signals are Letters and Figures, the latter causing printer 69 to perform a shift function. The next signal represents the character 2, and this is recorded by the printer on the next line below and one space to the right of the character 1, because no Carriage Return signal has been received by the printer following the printing of the character 1. Immediately following the character 2, the sequence Figures, H and Letters occurs, which causes the opening of contacts 43 and the activation of sequential selector A. This, in turn, is followed by a sequence of single character signals with intervening Letters signals, the character signals being X, A, B, C, D, E, F, G, I, J and K. None of the station cut-on contacts should be operated because these are only single character signals. It will be noted that the sequence begins with X, Letters and A. Since the character A does not immediately follow the character X, the contacts 42 should not operate because the intervening Letters signal should cancel the preparatory condition established by the character X. If the Letters signal should not affect the cancellation and contacts 42 should close, then all of the following characters, down to and including K, would be recorded by printer 69 which would indicate that an erroneous closure of station cut-on contacts occurred.

After the signal for the character K, selector magnet 8 receives a Letters signal and then a Line Feed signal which deactivates sequential selector A. A Letters signal follows the Line Feed signal and, in turn, is followed by the address code XA. If the sequential selector has been properly deactivated, the address code XA will not cause the closure of contacts 42. If the sequential selector A should erroneously respond to the address code XA and close contacts 42, the printer 69 will operate to the unshift condition in response to the next signal, Letters, and will then print the word "trouble."

Thereafter the selector magnet 8 receives a series of signal patterns each including the activate sequence, an address code, a deactivate signal, a Figures code and a numerical character, the address codes being XC, XD and XE, and the numerical characters being 3, 4 and 5, which are printed by printer 69 on successive lines and in successive spaces to the right of the numerical character 2 by virtue of the fact that printer 69 responds to the Line Feed signals which also deactivate sequential selector A.

The next series includes the activate sequence, the address code XF, which renders printer 69 responsive to subsequent signals through contacts not shown, the signals being an R preceded by a Letters signal, which unshifts printer 69, but not including a Line Feed signal, so that the R is printed on the same line and immediately to the right of the numerical character 5, the sequential selector A being then deactivated by Carriage Return and Line Feed signals which also cause Carriage Return and Line Feed operations in printer 69, the contacts for the address code XF remaining locked, after which selector magnet 8 receives the signals for Figures and the numerical character 6 which is printed on the next line below the legend 5R, but in vertical alignment with the letter character R and numerical character 1. Thereafter another repetition of patterns occurs, comprising activate, address code and deactivate signals, which differ by the inclusion of the address codes XG, XI, XJ and XK, and in association with those to be recorded by printer 69 the numerical characters 7, 8, 9 and 0. Line Feed signals included in the patterns as deactivate signals, also are received by the printer and cause the numerical characters 7, 8, 9 and 0 to be recorded on successive lines and in successive spaces to the right of the numerical character 6.

Assuming that the tape has been formed into a closed loop as stated hereinbefore, the Letters signals at the point of splicing of the tape will be transmitted and the entire sequence of test signals will be repeated. Because no Carriage Return signal occurs between the signal for the numerical character 0 at the end of the sequence and the signal for the letter character R associated with the address code XA at the beginning of the sequence, the letter character R will be printed on the same line and immediately to the right of the numerical character 0. Thereafter the testing cycle will be repeated until switch 31 is opened to suspend that test. Since the character R in the first pattern of the test sequence is printed beside the numerical character 0 and Carriage Return and Line Feed signals follow the character R, repetition of the test will cause the printing of the numerical characters 1, 2, 3, 4 and 5 in diagonal alignment on successive lines, due to the Line Feed signals, the numerical character 5 being followed by the character R, and in another diagonal alignment on successive lines directly under the numerical characters 1 to 5 will appear the numerical characters 6, 7, 8, 9 and 0, the latter having beside it the letter R. Any deviation from this pattern of characters recorded by the printer 69 will indicate the occurrence of a trouble, and may be readily discovered by scanning the copy produced by the printer.

The same testing sequence is used for testing the station cut-on contacts 46, 47, 48 and 49 of the sequential selector B. To perform this test, plug 11 is disconnected from socket 13 and plug 12 of a sequential selector B is connected to socket 14. The transmission path for controlling repeating relay R63 when a sequential selector B is being tested is traced from the spacing contact of relay S51 over conductor 55, contacts 19 and 18 of switch 16, conductor 56, contacts 7 and 6 of key 16, conductors 57 and 71, any of the station cut-on contacts 46, 47, 48 and 49 when closed, and conductors 72, 73 and 62, to the winding of relay R63. If sequential selector B, which has its selector magnet connected to the marking contact of relay S51 through conductors 52 and 74, performs its activate and deactive functions properly, and closes the station cut-on contacts 46, 47, 48 and 49 properly, it will produce at printer 69 the same pattern of characters that sequential selector A produces as described above.

The testing of sequential selector A in response to transmitter start codes will now be described. Before the closure of switch 31, the plug 11 of sequential selector A should be inserted into socket 13 and the operating member for any one of the station cut-on contacts, such as contacts 42, should be manually operated to the latched condition. Selectable elements responsive to the transmitter start codes A, B and C are substituted for the selectable elements actually employed in the particular sequential selector B for controlling the closure of transmitter start contacts 71, 72 and 73, respectively. The test tape may begin and end with Letters signals as before, for the purpose of splicing to form a continuous loop. It preferably contains the following sequence of signals. Blank, Space, A, Letters, A, Space, Letters, repeated six times, Blank, Space, B, Letters, B, Space, Letters, repeated six times, Blank, Space, C. Letters, C, Space, Letters, repeated six times. This entire sequence may be repeated a number of times but omitting the six repetitions of the Letters signal following the final character C and providing instead the signals for Carriage Return and Line Feed. The tape loop should be placed in the transmitter, and key 16 operated to its right-hand position. With the key operated to this position, an energizing circuit for relay SP36 is established, the path being traced from battery through the winding of that relay, conductor 76, contacts 13 and 14 of key 16, now closed, conductor 60, the manually operated and latched station cut-on contacts of sequential selector A, assumed to be contacts 42, normally closed Blank-Pause contacts 59, conductors 58 and 57, contacts 6 and 7 of key 16, conductor 56 and contacts 11 and 12 of the key, to ground. At its armature 1 and back contact, relay SP36 interrupts one of the previously-traced locking circuits for relay P34. At its armature 2 and front contact, relay SP36 locks through conductor 77, normally closed contacts 78 of sequential selector A that respond to the Space signal, and conductor 79, which is connected to one terminal of each of the normally opened transmitter start contacts 71, 72 and 73 to ground through plug 11 and socket 13. At its armature 3 and back contact, the relay SP36 disables the energizing circuit for relay A81.

The tape should have been placed in the transmitter with the first Blank signal of the test sequence above the tape-sensing pins. Upon the closure of switch 31, distributor shaft 27 rotates to effect the transmission of the Blank signal to selector magnet 8. Upon the opening of the transmitter auxiliary contacts 38, the locking circuit for relay P34 is interrupted, and that relay releases. At its armature 1, it interrupts the energizing circuit for start magnet 28 of the transmitter-distributor to cause the arrestment of shaft 27 upon completion of transmission of the Blank signal. At its armature 2, relay P34 disconnects ground from the control anode of gas-filled tube 82 to permit condenser 83 to begin charging. At its armature 3, the relay 34 disables its locking circuit, and through the back contacts controlled by that armature, it establishes an external circuit for the main anode of tube 82, through the winding of relay P34, to positive battery. The cathode of tube 82 is grounded.

The Blank signal received by sequential selector A sets in operation a mechanical timing mechanism as previously described, the function of which is to open the Blank-Pause contacts 59 and to unblock the operating lever for Space contacts 78. The timing constants of the charging circuit for condenser 83 associated with tube 82 are such that tube 82 fires about the time that the contacts 59 have opened and the operating member for contacts 78 has been unblocked. Contacts 59 open the original energizing circuit for relay SP36, but that relay remains operated through its locking circuit traced through the Space contacts 78.

Upon the firing of the control gap of tube 82 due to the accumulation of a charge on condenser 83, and upon the transfer of that discharge to the main gap, relay P34 reoperates, locking through its armature 3 and front contact, and the transmitter auxiliary contacts 38 which reclosed before the arrestment of distributor shaft 21, and interrupting, at the break contacts controlled by armature 3, the main discharge circuit for tube 82, quenching the tube. At its amature 2 and front contact, relay P34 disables the charging circuit for condenser 83, and at its armature 1 and front contact, it restores the circuit of transmitter start magnet 28, which releases shaft 21 for the transmission of the next signal which is a Space signal. As before, the transmitter auxiliary contacts 38 unlock relay P34, which releases to cause the arrestment of shaft 21 at the end of one revolution and to initiate another timing cycle of condenser 83.

Sequential selector A responds to the Space signal by opening the normally closed Space contacts 78, thereby interrupting the locking circuit for relay SP36, which releases. It should be noted at this point that the Blank-Pause contacts 59 latched in the open condition so that there is no circuit available for immediate re-energization of relay SP36. With relay SP36 released, a locking circuit for relay P34 independent of the transmitter auxiliary contacts 38 is prepared. Also, an energizing circuit for relay A81 is prepared. Upon the firing of tube 82 when condenser 83 becomes charged following the transmission of the Space signal, relay P34 again operates, reestablishing the circuit of transmitter start magnet 38 and locking under the control of relay SP36.

The next signal in the test tape is the signal for the character A, which is transmitted to selector magnet 8 of the sequential selector A to cause the momentary operation of transmitter start contacts 71 which were unblocked in response to reception of the Space signal. Contacts 71 complete an energizing circuit for relay A81, traced from ground through contacts of socket 13 and plug 11, conductor 79, transmitter contacts 71, conductor 84, winding of relay A81, and back contact and armature 3 of relay SP36 to battery. Relay A81 locks through its armature 1 and front contact and the back contact and armature 3 of relay SP36 to battery. Relay A81 completes a circuit for operation of repeating relay R63 from the Spacing contact of relay S51, the circuit being traced from that contact, over conductor 55, contacts 19 and 20 of key 16, conductor 86, front contact and armature 2 of relay A81, and conductors 87 and 62 to the operating winding of relay R63. Because of the fact that relay P34 is locked under the control of relay SP36, the transmitter auxiliary contacts 38 will not release the relay P34, and transmitter start magnet 28 will remain energized to cause the transmission of the Letters signal following the first A, the second A, the Space signal following the latter, and the six repetitions of the Letters signal following the Space. Accordingly, the printer 69 will respond to the second A signal, the Space signal and some of the Letters signals following the Space signal, and will record the character A. During the series of Letters signals following the Space signal, the Blank-Pause contacts 59 reclose under the control of the mechanical timing mechanism shortly before it completes its cycle and reestablish the operating circuit for relay SP36. This relay again locks through the Space contacts 78 of sequential selector A, unlocks relay A81 to render repeating relay R63 unresponsive to further signals, and if the transmitter-distributor is in the process of transmitting one of the Letters signals, the relay P34 will be released to cause arrestment of distributor shaft 21 at the end of the cycle, and recycling of the timing circuit. A pause will thus be introduced after each of the remaining Letters signals in the set of six following the Space signal, and after the Pause following the last of these Letters signals, the Blank signal will be transmitted as the first signal of the next transmitter start pattern which includes the signal B for operating transmitter start contacts 72. The sequence above described will be repeated for the transmission of the start pattern that includes the start signal B, and the character B will be recorded by printer 69 in response to the second occurrence of the signal for that character. Thus the printer 69 will record the sequence ABCABC etc., until the Carriage Return and Line Feed signals that conclude the test sequence are transmitted, whereupon the Carriage Return and Line Feed signals will be received by the printer 69 and will perform their assigned functions, because these signals immediately follow the final C signal in the test sequence and are repeated to the printer before the transmission of the series of Letters signals during which the Blank-Pause contacts reclose. The entire test sequence will be repeated until switch 31 is opened. In this way, the circuit control functioning of the Blank-Pause contacts 59, the Space contacts 78, and the transmitter start contacts 71, 72 and 73 is tested and, in addition, the mechanical operation of the sequential selector mechanism, particularly with regard to its selecting functions and the operation of the mechanical timing mechanism, is also tested.

For the testing of the response of sequential selector B to transmitter patterns, the plug 12 of such a selector is inserted into jack 14 of the test circuit, and if any sequential selector A had been connected to the test circuit through plug 11 and socket 13, it is disconnected. The operating lever of key 16 is moved to the left, and a special loop of tape is inserted in the transmitter-distributor. Selectable elements responsive to the transmitter start codes A, B, C and D are substituted for the selectable elements actually employed in sequential selector B for controlling the closure of transmitter start contacts 88, 89, 90 and 91, respectively. The tape should begin with a few Letters signals to be used for splicing purposes followed by the code sequence Blank, Space, A, B, C, D and Letters. The next sequence in the tape comprises the codes for Blank, Space, Space, A, B, C, D and Letters. This latter sequence, which differs from the first sequence by the inclusion of an extra Space signal, may be repeated a number of times, and the tape ends with the sequence Blank, Space, Space, A, B, C, D, Carriage Return, Line Feed, Letters and several additional Letters signals for cooperation with the Letters signals at the beginning of the tape for splicing into a closed loop. The tape should be placed in the transmitter with the first Blank signal positioned above the tape-sensing pins after which the manual switch 31 may be closed.

At the time of operation of the operating lever of key 16 to the left-hand position, an energizing circuit for relay SP36 was established, the circuit being traced from battery through the winding of that relay, conductor 76, contacts 1 and 2 of key 16, conductor 92, and contacts 17 and 18 of key 16, to ground. This relay does not lock through its armature 2 and front contact, because conductor 77 associated with armature 2 extends to one of the terminals of socket 13 where the path terminates. However, relay SP36 remains operated as long as key 16 is operated to the left, because the energizing circuit is not subject to interruption by any contacts of sequential selector B or of any relay. It follows from this that the locking circuit for relay P34 will be interrupted at the transmitter auxiliary contacts 38 during every revolution of distributor shaft 21, so that a pause will be introduced after every code combination transmitted by the distributor.

With switch 31 operated, the distributor transmits the Blank signal which is repeated by relay S51 to selector magnet 9 of sequential selector B. Relay P34 is released by contacts 38 during the transmission of this code combination to cause the arrestment of shaft 21 at the end of a revolution and the charging of condenser 83 until tube 82 fires, the result being that a pause is introduced following the transmission of the Blank signal. In response to that signal, the mechanical timing mechanism in sequential selector B is set in operation, and it closes the Blank-Pause contacts 93 and unblocks the Space contacts 94, these operations occurring before the timing circuit, comprising condenser 83 and tube 82, times out and restarts distributor shaft 21. The distributor transmits the Space signal in the next revolution and introduces a pause after that signal due to the release of relay P34. The Space contacts 94 close and latch in response to the Space signal. With contacts 93 and 94 closed, a circuit is established for operating repeating relay R63 from the spacing contact of relay S51, the circuit being traced from that spacing contact over conductor 55, contacts 19 and 18 of switch 16, conductor 56, contacts 7 and 8 of key 16, conductor 95, closed and latched Blank-Pause contacts 93, conductor 96, closed and latched Space contacts 94, and conductors 73 and 63, to the operating winding of relay R63. The signal transmitted after the Space signal is the code combination for the character A to which sequential selector B responds by momentarily closing transmitter start contacts 88. No circuit is completed by these contacts, but the code combination is repeated by relay S51 to relay R63 which, in turn repeats it to printer 69, causing that printer to record an A. The transmission path is traced from the marking contact of relay R63 over conductors 64 and 97, H signal generating contacts 98 and conductor 67 to the winding of selector magnet 68 of printer 69. As a result of the response of sequential selector B to the code combination for the character A, a cam which is driven through a single revolution clutch is set in operation to operate contacts 98 to generate the code combination for the character H, as hereinbefore described. Because contacts 4 and 5 of key 16 are now open, a previously traced shunt around contacts 98 is removed. In the pause that occurs following the transmission of the A signal, the armature of relay R63 steadily engages its marking contact, because relay S51 is receiving no signals, but the H sensing contacts 98 operate under the control of the cam (not shown) to transmit to printer 69 a code combination which causes the character H to be printed immediately following the character A.

In like manner, the distributor transmits the code combinations for the characters B, C and D, these code combinations causing the momentary closure of transmitter start contacts 89, 90 and 91, respectively, and the corresponding characters being printed by printer 69, each being followed by the character H generated by contacts 98. The pause introduced after each cycle of distributor shaft 21 permits the generation of the H signal and the recording of the character H without interference, so that the printer records the sequence AHBHCHDH. The next signal in the sequence is a Letters signal, and the effect of this in sequential selector B is to unlatch the Blank-Pause contacts 93 and the Space contacts 94 which interrupt the operating circuit for relay R63. Thus sequential selector B is restored to the initial condition.

Subsequent sequences differ from the one just described only by including an extra Space signal before the first transmitter start signal A. The first of the two Space signals completes the operating path for relay R63. The second of the two Space signals performs no useful function in sequential selector B, since contacts 94 are already operated and latched, but that signal is repeated to printer 69 for effecting operation of the Space function of the printer, whereby the second sequence of characters AHBHCHDH will be set off from the first by a space. This will be true of all subsequent sequences of characters because each subsequent sequence of signals in the tape includes an extra Space signal. The last sequence in the tape includes Carriage Return and Line Feed signals ahead of the Letters signals. Since the Blank-Pause contacts 93 and Space contacts 94 remain closed until they are unlatched in response to a Letters signal, the Carriage Return and Line Feed signals are repeated to printer 69 to cause the performance of those functions by the printer. Thus repetitious transmissions of the entire sequence of signals in the tape will be printed on successive lines. As in the case of the other tests, the testing of sequential selector B for response to transmitter start patterns is terminated by the opening of switch 31.

The use of the signal sequence, hereinbefore described for testing the sequential selector B in response to transmitter start patterns, results in the testing of the circuit control functioning of the Blank-Pause contacts 93, the Space contacts 94, and the H sending contacts 98. It also results in the testing of the mechanical operation of sequential selector B, particularly with respect to the transmitter start code operating levers, the mechanical timer and the H answer-back mechanism, including the cam and single revolution clutch. It is not necessary to provide checking circuits including the transmitter start code contacts 88, 89, 90 and 91 because the operation of the H sending contacts 98 is indicative of the proper operation of the selectable members that operate those contacts.

Although a specific embodiment of the invention has been shown in the drawings and described in the foregoing specification, it will be understood that the invention is not limited to the specific embodiments but is capable of modification, substitution and rearrangement of parts and elements without departing from the spirit of the invention.

What is claimed is:

1. In a test apparatus for a signal responsive selector mechanism having selectable members operable selectively in response to predetermined signals and answer-back signal generating means activated incident to selective operation of certain of said selectable members, a signal transmitter connected to transmit to said selector mechanism, a signal storage record for controlling said transmitter including predetermined signals, a start magnet for said transmitter having an energizing circuit, means controlled by said transmitter in each transmitting cycle for interrupting said energizing circuit, and timing means for effecting delayed reclosure of said circuit for precluding transmission of a signal during operation of said answer-back signal generating means.

2. In a test apparatus for a signal responsive selector mechanism having selectable members operable selectively in response to predetermined signals and answer-back signal generating means activated incident to selective operation of certain of said selectable members, a signal transmitter connected to transmit to said selector mechanism, a signal storage record for controlling said transmitter including said predetermined signals, a start magnet for said transmitter, a relay operable to complete an energizing circuit for said start magnet to initiate operation of said transmitter, a locking circuit for said relay including contacts which open during each cycle of said transmitter to release said relay, and timing means recycled upon each release of said relay for reoperating said relay after a delay interval to preclude transmission of a signal during operation of said answer-back signal generating means.

3. In a test apparatus for a signal responsive selector mechanism having selectable members operable selectively in response to predetermined signals and answer-back signal generating means activated incident to selective operation of certain of said selectable members, a signal transmitter connected to transmit to said selector mechanism, a signal storage record for controlling said transmitter including said predetermined signals, means for causing said transmitter to introduce a pause after the transmission of each of said predetermined signals to accommodate the generation of said answer-back signal before reception by said selector mechanism of the next of said predetermined signals, and recording means responsive to said transmitter and said answer-back signal generating means for recording characters represented by said predetermined signals and said answer-back signal.

4. In a test apparatus for a signal responsive selector mechanism having selectable members operable selectively in response to predetermined signals and answer-back signal generating contacts operable to generate a signal incident to selective operation of certain of said selectable members, a signal transmitter connected to transmit to said selector mechanism, a signal storage record for controlling said transmitter including said predetermined signals, a repeating relay controllable by said selectable members to be responsive to said predetermined signals, a printing telegraph receiver terminating a transmission path controlled by said repeating relay for recording characters corresponding to said predetermined signals, said transmission path including said answer-back signal generating contacts to cause said receiver to record also the character represented by said answer-back signal, and means for causing said transmitter to introduce a pause after each of said predetermined signals for precluding simultaneous transmission to said receiver by said repeating relay and said answer-back signal generating contacts.

5. In a test apparatus for a signal responsive selector mechanism having certain selectable members operable selectively in response to predetermined signals and certain other selectable members operable selectively in response to signals representing characters interspersed among said predetermined signals and answer-back signal generating contacts operable to generate a signal incident to selective operation of said certain other selectable members, a signal transmitter connected to transmit said predetermined signals and said interspersed signals to said selector mechanism, a repeating relay controllable by said certain selectable members to be responsive to said interspersed signals, a printing telegraph receiver controlled by said repeating relay for recording said characters representing said interspersed signals, means controlled by said answer-back signal generating contacts for causing said receiver to record also the character represented by said answer-back signal and means for causing said transmitter to introduce a pause after each of said interspersed signals for precluding the simultaneous recording of said interspersed signals and said answer-back signal.

References Cited in the file of this patent
UNITED STATES PATENTS

| | | |
|---|---|---|
| 1,775,687 | Milnor et al. | Sept. 16, 1930 |
| 2,015,323 | Singer | Sept. 24, 1935 |
| 2,034,806 | Griffin | Mar. 24, 1936 |
| 2,439,398 | Praizner | Apr. 13, 1948 |
| 2,568,019 | Martin | Sept. 18, 1951 |
| 2,706,215 | Van Duuren | Apr. 12, 1955 |